United States Patent [19]

Hyslop

[11] 4,042,992
[45] Aug. 23, 1977

[54] PORTABLE REINFORCED LOADING RAMP

[75] Inventor: Robert C. Hyslop, Spokane, Wash.

[73] Assignee: Herbert Management Co., Inc., Spokane, Wash.

[21] Appl. No.: 718,761

[22] Filed: Aug. 30, 1976

[51] Int. Cl.² .............................................. E01D 15/00
[52] U.S. Cl. ..................................................... 14/69.5
[58] Field of Search .......................... 14/1, 69.5; 404/1

[56] References Cited

U.S. PATENT DOCUMENTS

| 1,566,427 | 12/1925 | Reneau | 14/69.5 X |
| 1,568,303 | 1/1926 | Webster | 14/69.5 |
| 3,517,791 | 6/1970 | Miles | 14/69.5 X |
| 3,818,528 | 6/1974 | Peterson | 14/69.5 |

Primary Examiner—Nile C. Byers
Attorney, Agent, or Firm—Wells, St. John & Roberts

[57] ABSTRACT

A portable reinforced loading ramp is described that is transversely expandable to enable the ramp to be used for loading automobiles. The ramp is constructed with two body sections having means for interconnecting the two body sections to hold the two sections securely together when the ramp is in the contracted position. The interconnecting means includes two longitudinally spaced alignment and locking assemblies for holding the two sections securely together to prevent the two sections from spreading under high load conditions when in the contracted position and for quickly disconnecting the two sections to enable the two sections to be spaced from each other to accommodate wide loads such as an automobile.

2 Claims, 5 Drawing Figures

PORTABLE REINFORCED LOADING RAMP

BACKGROUND OF THE INVENTION

This invention relates to portable loading ramps and more particularly to portable loading ramps that are capable of being expanded for loading automobiles through wide openings and being contracted to load dolly-supported freight through more narrow openings in the side or rear of moving vans and the like. Lightweight portable reinforced loading ramps are quite prevalent in the moving industry for assisting movers in loading freight and household goods into moving vans and trailers. Sometimes it is desirable to load automobiles onto a moving van. In the past, it is generally required that the mover utilize two ramps to be able to load an automobile.

One of the principal objects of this invention is to provide a very versatile portable reinforced loading ramp that is capable of being expanded for loading automobiles into moving vans and contracted to load dolly-supported freight through more narrow openings in a traditional manner.

An additional object of this invention is to provide a portable reinforced loading ramp that is constructed in two parts having interconnecting means for connecting the two parts together to serve as a traditional loading ramp for dolly-supported freight and which can be unconnected and separated for supporting an automobile as it is being rolled into a moving van.

A further object of this invention is to provide a two-piece portable loading ramp having interconnecting means for interconnecting the two components to prevent each member from moving longitudinally with respect with the other during use.

A further object of this invention is to provide a two-piece loading ramp having locking means for holding the two pieces snuggly together to prevent the two pieces from separating during heavy loading, particularly along the center of the ramp.

A still further object of this invention is to provide a twopiece reinforced loading ramp that may be readily constructed and very efficient in operation.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings in which.

DETAILED DESCRIPTION OF A PREFERRED EMBODIMENT

Figure 1:
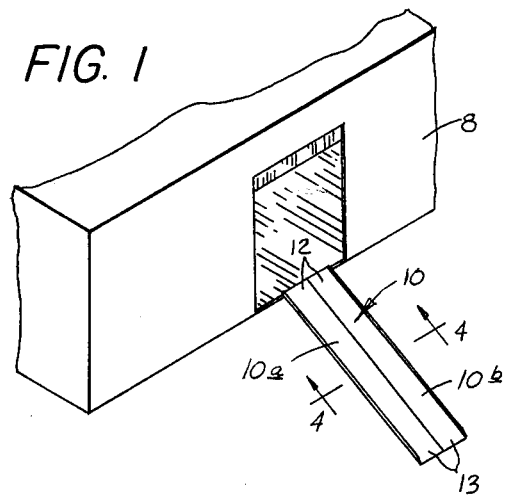
FIG. 1 is a fragmentary isometric view showing a portable reinforced loading ramp embodying the principal features of this invention in which the loading ramp is illustrated in a contracted position for loading dolly-supported freight through a rather narrow opening of a moving van.
Figure 2:
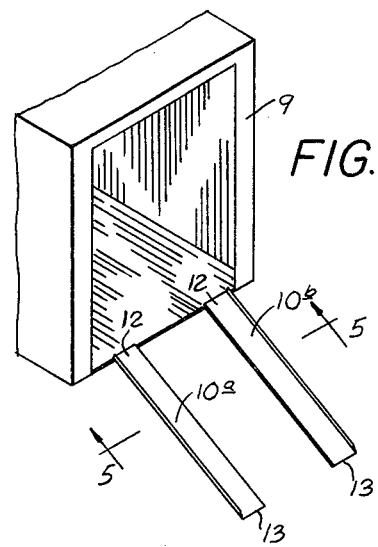
FIG. 2 is a fragmentary isometric view showing the loading ramp illustrated in FIG. 1 in an expanded condition for enabling an automobile to be loaded through a wide opening of the moving van.
Figure 3:
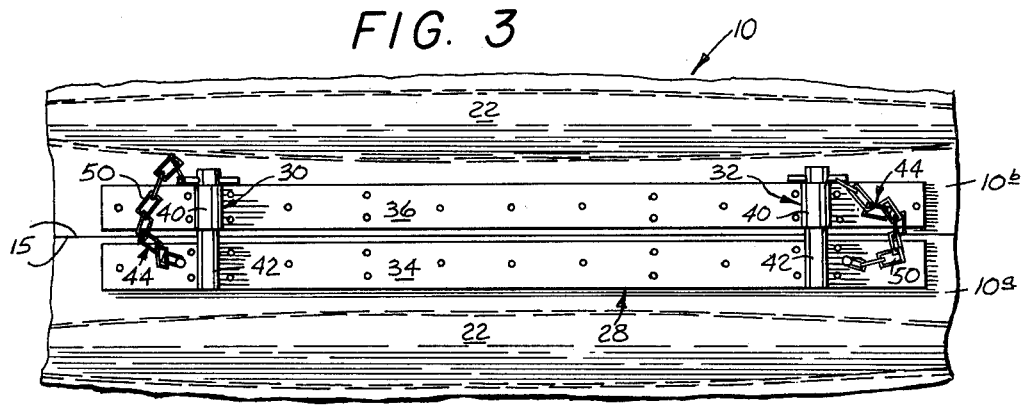
FIG. 3 is a fragmentary bottom view of a section of the loading ramp particularly emphasizing and showing interconnecting means for interconnecting and locking two sections of the loading ramp together in a contracted position.

In referring to the drawing, there is illustrated in FIG. 1 a ramp generally designated with numeral 10. The ramp 10 is composed of two longitudinal body sections 10a and 10b that are capable of being mounted in a contracted position illustrated in FIG. 1 for loading freight generally with the use of a dolly through a rather narrow opening of a moving van 8. In FIG. 2, the ramp 10 is illustrated with the two body sections 10a and 10b being expanded and separated to enable a wide object such as an automobile to be loaded into the end opening of a moving van 9.

Each body section 10a and 10b extends between ends 12 and 13. Each section 10a and 10b has an outer raised outer edge or lip 14 with an inside side face 15. Each section 10a and 10b is constructed of a sheet material 17, such as plywood, that extends between the ends 12 and 13. The sheet material 17 is supported by reinforcing outside rib 20 and inside rib 22. The ribs 20 and 22 are preferably constructed of a fiberglass resin material. The sheet material 17 is preferably layered with a surface material 24 constructed of a high traction material such as crushed walnut shells supported in a solid resin binder.

Figure 4:
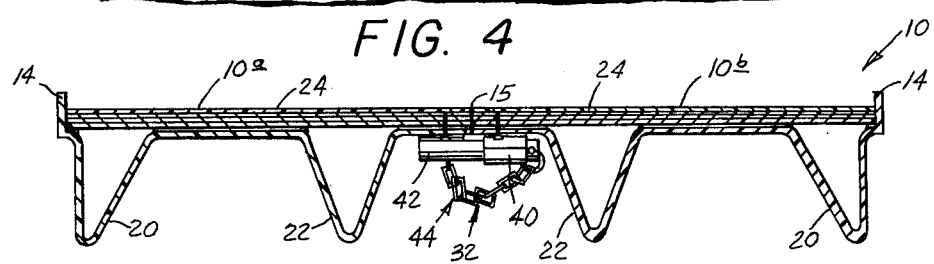
FIG. 4 is a cross-sectional view taken along line 4—4 in FIG. 3.

The ramp 10 includes an inerconnecting means 28 affixed to the underside of the ramp 10 for interconnecting the two sections 10a and 10b with the innerfaces 15 abutting and with the top surfaces 24 of the ramps sections 10a and 10b being flush as illustrated in FIG. 4.

Interconnecting means 28 includes two longitudinally spaced alignment and locking assemblies 30 and 32. The interconnecting means 28 includes two mounting plates 34 and 36 that are mounted on respective ramp sections 10a and 10b for supporting assemblies 30 and 32. The mounting plates 34 and 35 are mounted in parallel arrangement adjacent respective inner side faces 15. The mounting plates 34 and 36 are secured to their respective ramp sections 10a and 10b by securing means such as rivets 38.

It should be noted that the mounting plates 34 and 36 extend longitudinally between the assemblies securely to the bottom of the ramp sections 10a and 10b. Each of the alignment locking assemblies 30, 32 include an open-end receiving cylinder element 40 affixed to one of the mounting plates 34, 36 and a projecting shaft element 42 affixed to the other mounting plate 34, 36 and a projecting shaft element 42 extends transversely outward from its respective inner side face 15 for fitting through the open ends of the corresponding cylinder element 40. The projecting shaft element 42 is sufficiently long to project entirely through the corresponding cylinder element 40 with the very end of the shaft element projecting outward therefrom.

Figure 5:
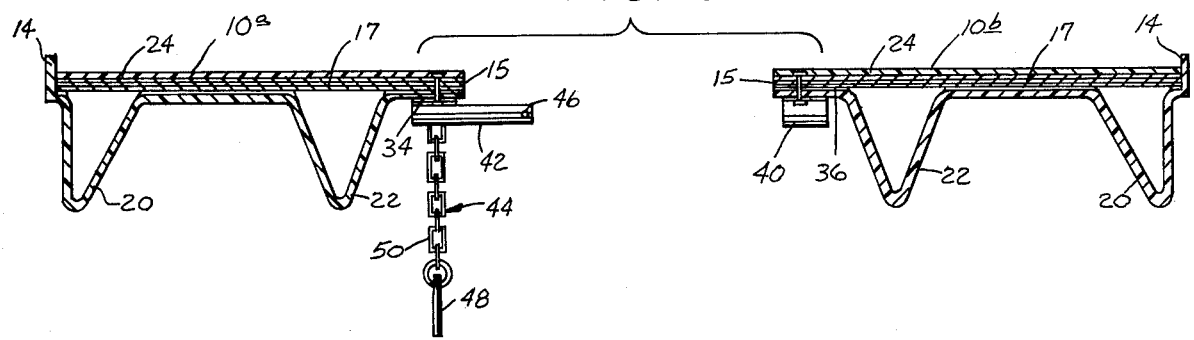
FIG. 5 is a cross-sectional view similar to FIG. 4 except showing the two sections of the ramp separated.

Each of the alignment and locking assemblies 30 and 32 include a locking means 44 for releasably securing the shaft element 42 into the respective receiving cylinder 20 to hold the ramp sections 10a and 10b in a contracted position with the inner side faces 15 engaging each other. Each locking means includes a transverse hole or aperture 46 (FIG. 5) extending through the end of the shaft element 42 with a locking pin 48 that is extendable into he hole or aperture 46 for preventing the shaft element 42 from being removed unintentionally from the receiving cylinder element 40. The locking pins 48 are supported on the end of chains 50 that are secured to the plates 34, 36 to prevent the locking pins 48 from being lost.

It is important that the alignment assemblies 30 and 32 be longitudinally spaced from each other to securely hold the ramp sections 10a and 10b securely to each other at longitudinally spaced locations. Additionally, the assemblies 30 and 32 prevent any longitudinal movement of the ramp sections 10a and 10b with respect to each other. It is very important that during loading the ramp elements 10a and 10b be rigidly secured to each other to prevent inadvertent accidents. Furthermore, the interconnecting means 28 prevents the ends 12 and 13 and the center of the ramp section 10a and 10b from spreading during high load condition. The alignment and locking assemblies 30 and 32 are constructed so that they will not work free with normal continuous use. Furthermore, it is important that the alignment and locking assemblies 30 and 32 be easily disconnected to enable the sections to be spread apart as illustrated in FIG. 2 to enable the ramp sections to be used together in spaced relationship.

Although the ramp 10 is illustrated for use in loading articles in a rather narrow opening in the side of a moving van in FIG. 1 and in loading an automobile through the end of a moving van in FIG. 2, it should be appreciated that other uses can be made of the ramp 10 depending on the various circumstances.

It should be understood that the above described embodiment is simply illustrative of the principles of this invention and that numerous other embodiments may be readily devised without deviating therefrom. Therefore only the following claims are intended to define this invention.

What is claimed is:

1. A portable reinforced loading ramp capable of being transversely expanded to load an automobile through a wide opening and of being transversely contracted to load dolly-supported freight through a narrow opening, comprising:

a first elongated body section having an outer raised side edge and an inner side face and integral reinforcing support ribs;

a second elongated body section having an outer raised side edge and an inner side face complementary to the inner side face of the first elongated body section and integral reinforcing supporting ribs;

interconnecting means operatively interconnecting the first and second body section with the inner side faces engaging when the ramp is in the contracted position;

said interconnecting means includes at least two alignment and locking assemblies mounted to the body section adjacent the inner side faces at longitudinally spaced locations for longitudinally aligning the body sections with respect to each other and for locking the body sections together with the inner side faces engaging when the ramp is in the contracted position;

wherein the interconnecting means includes parallel elongated mounting plates mounted to respective elongated body section adjacent the inner side faces and extending between the longitudinally spaced locations for supporting the alignment and locking assemblies rigidly to the body section;

each of said alignment and locking assemblies comprising;
   1. a male shaft element mounted to one of the mounting plates and projecting therefrom transversely to the longitudinal direction of the one body section;
   2. a female open-ended cylinder element mounted to the other mounting plate and directed transversely to the longitudinal direction of the other body section for receiving the male shaft element therein when the ramp is contracted to longitudinally align the body sections and prevent longitudinal movement therebetween; and
   3. locking means for releasably securing the male shaft element in the cylinder element when the ramp is contracted.

2. The reinforced ramp is defined in claim 1 wherein the locking means includes transverse aperture formed in the shaft element and a locking pin for inserting through the aperture to lock the shaft element in the corresponding cylinder element.

* * * * *